United States Patent
Buckley (10) Patent No.: US 7,031,534 B2
(45) Date of Patent: Apr. 18, 2006

(54) ENHANCEMENT OF COMPRESSED IMAGE DATA

(75) Inventor: Robert R. Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 900 days.

(21) Appl. No.: 10/002,070

(22) Filed: Oct. 31, 2001

(65) Prior Publication Data

US 2003/0081842 A1 May 1, 2003

(51) Int. Cl.
*G06K 9/36* (2006.01)
*G06K 9/46* (2006.01)

(52) U.S. Cl. .................. 382/240; 382/233; 382/248

(58) Field of Classification Search ............ 382/233, 382/240, 248, 254, 274; 375/240.19
See application file for complete search history.

(56) References Cited

U.S. PATENT DOCUMENTS

| | | | |
|---|---|---|---|
| 5,414,538 A | | 5/1995 | Eschbach |
| 5,450,502 A | | 9/1995 | Eschbach et al. |
| 6,476,805 B1 | * | 11/2002 | Shum et al. ............ 345/420 |
| 6,757,437 B1 | * | 6/2004 | Keith et al. ............ 382/240 |

OTHER PUBLICATIONS

*Wavelets and Subband Coding*, Vetterli and Kovacevic, Prentice Hall PTR (1995) (Book not enclosed).
*Wavelets and Filter Banks*, Strang and Nguyen, Wellesley–Cambridge Press (1996) (Book not enclosed).
*Wavelet Basics*, Y. T. Chan, Kluwer Academic Publishers (1995) (Book not enclosed).

* cited by examiner

*Primary Examiner*—Phuoc Tran
(74) *Attorney, Agent, or Firm*—Fay, Sharpe, Fagan, Minnich & McKee, LLP (57) ABSTRACT

A xerographic apparatus, a printer, a printer server, and the like processes wavelet domain image data and includes means for receiving the wavelet domain image data representative of an input digital image. The wavelet domain image data may be formatted as a JPEG 2000 compressed file or other wavelet domain file including N levels of wavelet decompositions. An M-level extractor extracts an Mth level wavelet decomposition from the wavelet domain image data where M is <N. The extracted Mth level wavelet decomposition is a low resolution representation of the input digital image. An image enhancement system receives the extracted Mth level wavelet decomposition and derives an enhancement process such as a tone reproduction curve, a sharpness filter, and the like from the extracted Mth level wavelet decomposition. The enhancement process is used to enhance a higher resolution representation of the digital input image.

18 Claims, 6 Drawing Sheets

ENHANCEMENT OF COMPRESSED IMAGE DATA

CROSS REFERENCE TO RELATED U.S. PATENTS

Cross reference is made to the following commonly assigned U.S. Patents or applications to Eschbach et al., each of which is hereby expressly incorporated by reference herein: U.S. Pat. Nos. 5,414,538; 5,357,352; 5,450,502; 5,371,615; 5,363,209; 5,450,217; and, 5,802,214 and Ser. No. 09/448,947. Similarly, commonly assigned U.S. Pat. No. 5,347,374 to Fuss et al. is also hereby expressly incorporated by reference herein.

BACKGROUND OF THE INVENTION

In the past, a typical application for copiers or scan-to-print image processing systems was to reproduce an input image as accurately as possible, i.e., render a copy. Thus, copies have been rendered as accurately as possible, including flaws in the source image. However, as customers have become more sophisticated in their document reproduction requirements, they have recognized that an exact copy is often not desired. Instead, an inexact copy that is perceived as a higher quality image has been deemed more desirable.

Until recently, image quality from the output of a copier or a scan-to-print system was directly related to the quality of the input image. While this has been satisfactory for reproducing images of text or line drawings, it has been found to be sub-optimal for purposes of reproducing photographs and other more complex images. With photographs, in particular, reproduction is complicated given the inexact nature of the discipline, variations in equipment, aging of photographs, and the like. Given that the input image is often poor quality, it has been deemed desirable to render an output image that is perceived to be the "best" possible image (or at least superior to the input image), rather than an exact copy.

The above-noted patents to Eschbach et al. and Fuss et al. disclose an Automated Image Enhancement (AIE) system. This system receives an optionally sub-sampled description of the input image, and alters the tone reproduction curve (TRC)—a curve that defines the relationship of an input image signal to an output image signal for purposes of enhancement—and/or derives or alters a sharpness filter for that image on an image-by-image basis, as appropriate, so that the resulting output image is perceived to be superior to the input image. AIE is used, for example, to alter perceived exposure, luminance, sharpness, saturation, color balance, and the like to provide an output image that is preferable to the input image. It is important to note that AIE performs well even if it has to rely upon a sub-sampled image to statistically analyze the overall image. AIE does not require that each and every item of image information be analyzed. Of course, this sub-sampling speeds image enhancement operations and reduces the size/number of memory buffers required to implement the AIE system.

More particularly, for example, U.S. Pat. No. 5,414,538 entitled "Image-Dependent Exposure Enhancement" discloses a method of altering the perceived exposure of an output image produced from an input image that includes: (a) receiving the input image defined in terms of red-green-blue (RGB) signals; (b) converting the RGB signals to corresponding luminance-chrominance signals including at least one signal that represent overall image intensity; (c) comparing the intensity signal to upper and lower intensity threshold signals that define the acceptable levels of brightness and darkness in the image; (d) if one of the thresholds is exceeded, the image signal representative of image intensity is processed according to a select equation, and a TRC associated with the image is adjusted so that exposure characteristics of the resulting output image are perceived to be superior to those of the input image.

U.S. Pat. No. 5,450,502 entitled "Image-Dependent Luminance Enhancement" discloses a method of altering the perceived luminance of an output image produced from an input image that includes: (a) receiving the input image data defined in terms of a color space; (b) if required, converting the input image data into a luminance-chrominance color space wherein at least one term bears a relationship to overall intensity of the input image; (c) deriving a global intensity histogram for the overall input image; (d) filtering the histogram signal to flatten high peaks and low valleys without altering its relatively flat portions; and, (e) utilizing the filtered histogram signal to control TRC mapping in a device with which the image is to be rendered. In accordance with another aspect of the disclosed luminance enhancement method, the input image can be divided into plural regions, and a local intensity histogram signal can be derived for each region. If any of the local histogram signals are flatter than the global histogram signal, the local signals are summed and used in place of the global histogram as input to the histogram flattening filter.

The methods described in the Eschbach et al. '538 and '502 patents, and the other Eschbach et al. and Fuss et al. patents noted above, are described in connection with uncompressed image data. However, in many image processing operations, the image data is retrieved from an image storage device or other location or is otherwise supplied in a compressed form to minimize image storage space.

Thus, heretofore, image enhancement operations typically have required that the compressed images first be decompressed or "decoded" for image enhancement operations. This is undesirable in that the decompression operation slows the overall enhancement operation, the image processing apparatus must be provided with additional memory to accommodate large amounts of uncompressed image data, and each compression operation itself, further degrades the image data due to data loss.

Accordingly, it is desirable to provide method and system which overcomes the above-mentioned difficulties and others.

SUMMARY OF THE INVENTION

In accordance with one embodiment of the present invention, an image processing method includes receiving packets of compressed image data. A first subset of the compressed data is decompressed and an adjustment is determined from the first subset to be applied to the image data.

In accordance with another aspect of the present invention, the method further includes continued decompressing of additional subsets resulting in a decompressed image at a desired resolution. The adjustment is then applied to the decompressed image.

In accordance with another aspect of the present invention, the method further includes incorporating the adjustment into the compressed image data, and storing the compressed image data and the incorporated adjustment.

In accordance with another embodiment of the present invention, an image processing method includes receiving wavelet domain data defining a digital image where the wavelet domain data includes N levels of decomposition. M levels, where M is less than N, are then input into an automated image enhancement system which derives at least one of a tone reproduction curve and a sharpness filter for enhancement of the input digital image data. The image data is more completely decompressed, either concurrently or at a later time, to obtain decompressed image data representing the digital image at a selected level of decomposition. Using either or both of the final reproduction curve or sharpness filter, the decompressed image data is enhanced.

In accordance with another aspect of the present invention, the method further includes storing either or both the tone reproduction curve or sharpness filter for subsequent use in enhancing the digital image.

In accordance with another aspect of the present invention, the step of inputting M levels into an automated image enhancement system includes inputting the M levels to at least one of an exposure enhancement module, a color balance enhancement module, a contrast enhancement module, and a luminance enhancement module.

In accordance with another aspect of the present invention, the step of storing either or both of the final reproduction curve or the sharpness filter for subsequent use includes binding the tone reproduction curve or sharpness filter to the received image data.

In accordance with another aspect of the present invention, the inputting M levels into an automated image enhancement system includes inputting the M levels to a sharpness enhancement module that derives a sharpness filter.

In accordance with another embodiment of the present invention, a wavelet domain image processing method includes receiving image data defining an N level wavelet decomposition of a digital image. Each level n=1 through N of said decomposition includes a horizontal subband H, a vertical subband V, and a diagonal subband D. Image enhancement analysis is then performed using a low pass subband on an Mth level wavelet decomposition, where M<N.

In accordance with another embodiment of the present invention, a xerographic apparatus which processes wavelet domain image data includes means for receiving the wavelet domain image data representative of the input digital image. The wavelet domain image data includes N levels of wavelet decompositions. An M-level extractor extracts an Mth level wavelet decomposition from the wavelet domain image data where M<N. The extracted Mth level wavelet decomposition is a low resolution representation of the input digital image. An image enhancement system receives the extracted Mth level wavelet decomposition and derives an enhancement process from the extracted wavelet decomposition to adjust higher resolution representations of the digital input image.

In accordance with another aspect of the present invention, the enhancement process includes a tone reproduction curve.

In accordance with another aspect of the present invention, the enhancement process includes a sharpness filter.

In accordance with another aspect of the present invention, the apparatus further includes means for converting the wavelet domain image data into the high resolution representation of the input digital image and a processor which applies the enhancement process to the high resolution representation.

In accordance with another aspect of the present invention, the apparatus further includes a storage which at least temporarily stores the enhancement process for subsequent use in enhancing the input digital image.

In accordance with another aspect of the present invention, the storage includes data representative of the enhancement process inserted in the wavelet domain image data.

In accordance with another aspect of the present invention, the image enhancement system includes at least one of an exposure enhancement module, a color balance enhancement module, a contrast enhancement module, and a luminance enhancement module.

Still further advantages and benefits of the present invention will become apparent to those of ordinary skill in the art upon reading and understanding the following detailed description of the preferred embodiment.

BRIEF DESCRIPTION OF THE DRAWINGS

The present invention may take form in various steps and arrangements of steps, and in certain components and arrangements of components. The drawings are only for purposes of illustrating the preferred embodiments and are not to be construed as limiting the invention.

DETAILED DESCRIPTION OF THE PREFERRED EMBODIMENT

Figure 1:
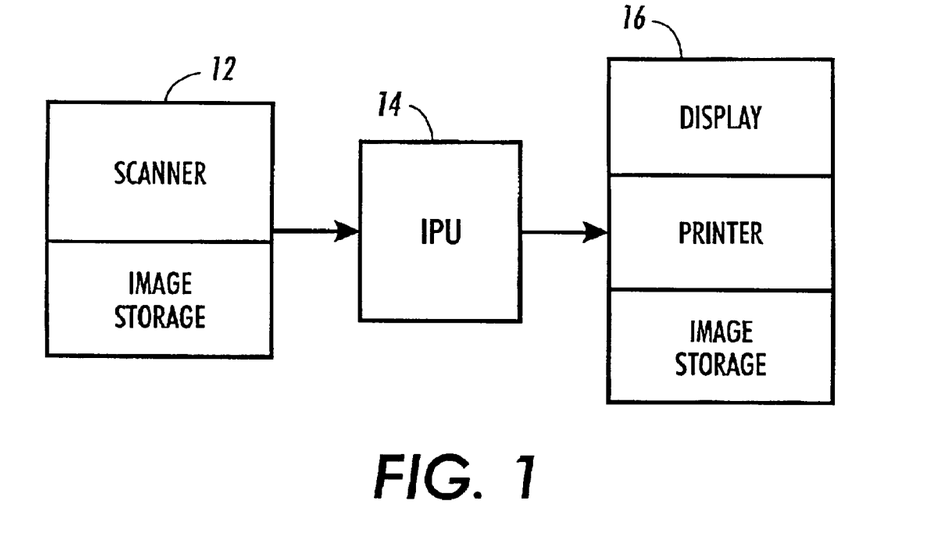
FIG. 1 is a diagrammatic illustration of a digital image processing apparatus in accordance with the present invention.

Referring now to the drawings wherein the showings are for purposes of illustrating a preferred embodiment of the invention only and not for limiting the invention in any way, FIG. 1 diagrammatically illustrates an image processing apparatus including an image input terminal 12, an image processing unit (IPU) 14, and an image output terminal 16. The input terminal 12 can be any source of digital image data including a scanner, digital camera, or a source of stored image data. The image processing unit 14 is provided by any suitable electronic computing apparatus including a microprocessor or the like for carrying out digital image processing as described herein. Image data from the input terminal 12 are supplied to the IPU 14 for processing. After processing the data, the IPU 14 outputs the processed data to the image output terminal 16 which can include a non-impact printer, video display, image storage device or the like.

The decomposition of a digital image into different frequency subbands or subband images using a discrete wavelet transform is known. The discrete wavelet transform and its inverse transform are well-known and fully described in *Wavelets and Subband Coding,* Vetterli and Kovacevic, Prentice Hall PTR (1995); *Wavelets and Filter Banks,* Strang and Nguyen, Wellesley-Cambridge Press (1996); and, *Wavelet Basics,* Chan, Kluwer Academic Publishers (1995), each of which is hereby expressly incorporated by reference herein.

Figure 2:
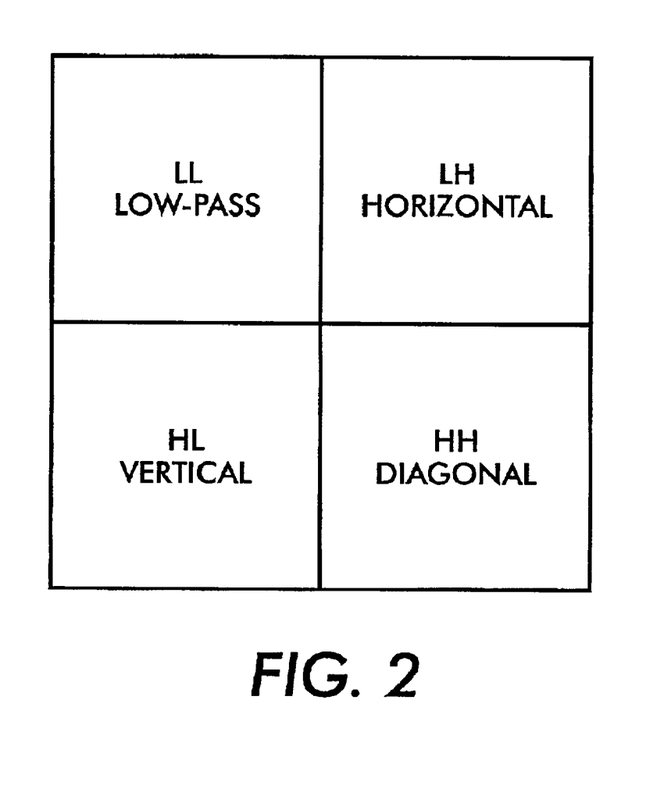
FIG. 2 is a diagrammatic illustration of a single-level wavelet decomposition of a digital image.

Referring now to FIG. 2, a one-level wavelet decomposition corresponding to an original digital image is illustrated. As is known, the wavelet decomposition of a digital image comprises four subbands LL,LH,HL,HH. The low-pass subband LL is defined by a low-pass, sub-sampled version of the original image (i.e., by the low-frequency information for both the vertical and horizontal directions in the original image); the horizontal subband LH is defined by the low-frequency vertical information and the high-frequency horizontal information in the original image; the vertical subband HL is defined by the high-frequency vertical information and the low-frequency horizontal information in the original image; and the diagonal subband HH is defined by the high-frequency diagonal information in the original image (i.e., by the high-frequency information for both the vertical and horizontal directions in the original image).

Figure 3:
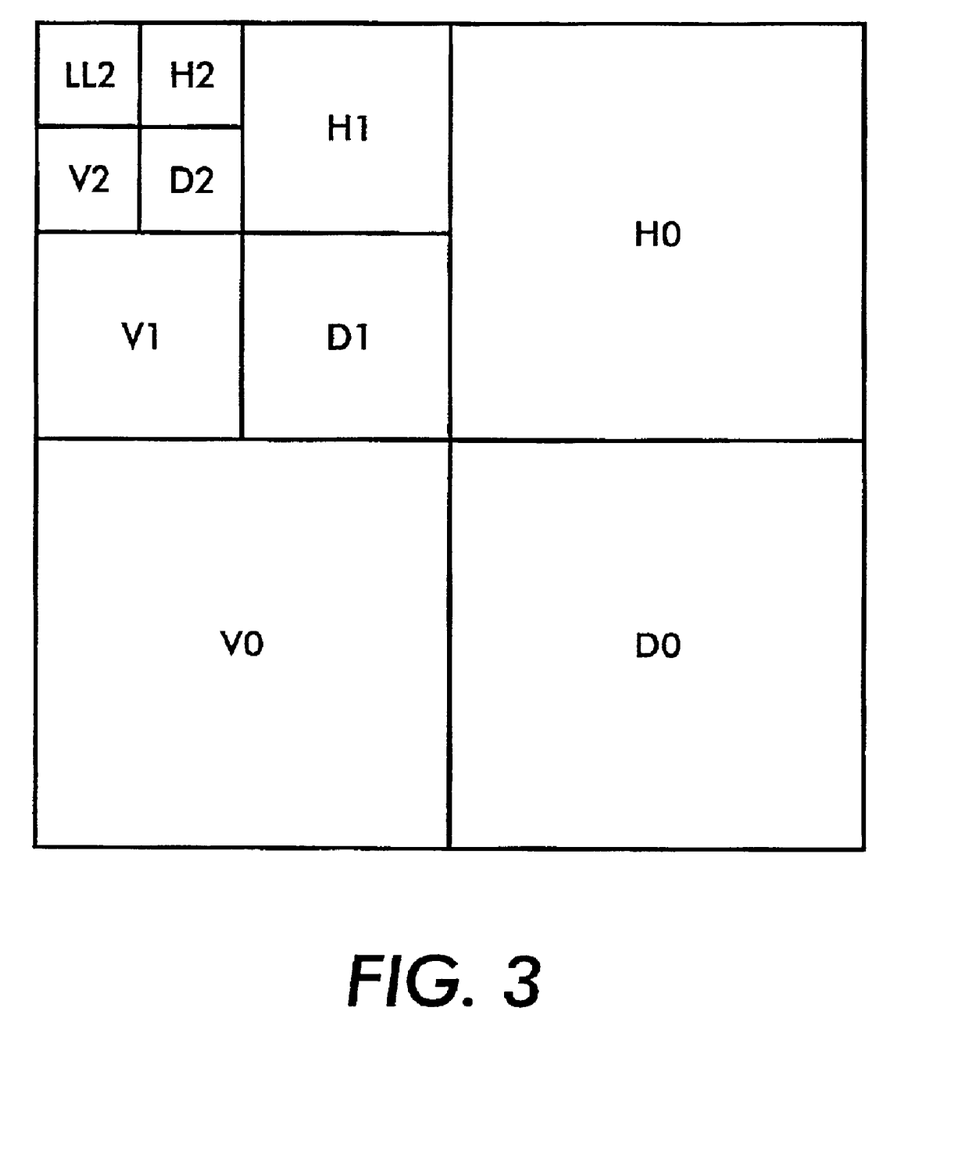
FIG. 3 is a diagrammatic illustration of multiple-level (i.e., 3 level) wavelet decomposition of a digital image.

Referring now to FIG. 3, the first level wavelet decomposition of the original image comprises a horizontal subband H0, a vertical subband V0 and a diagonal subband D0 as described above. The low-pass subband, itself, has been subjected to a wavelet decomposition so that a second-level of subbands H1,V1,D1 are defined. Here, again, the second-level low-pass subband has been subjected to a wavelet decomposition so that a third level of wavelet subbands is defined by a third-level low-pass subband LL2, a third-level horizontal subband H2, a third-level vertical subband V2 and a third-level diagonal subband D2. The wavelet decomposition can be repeated further if desired.

Figure 4:
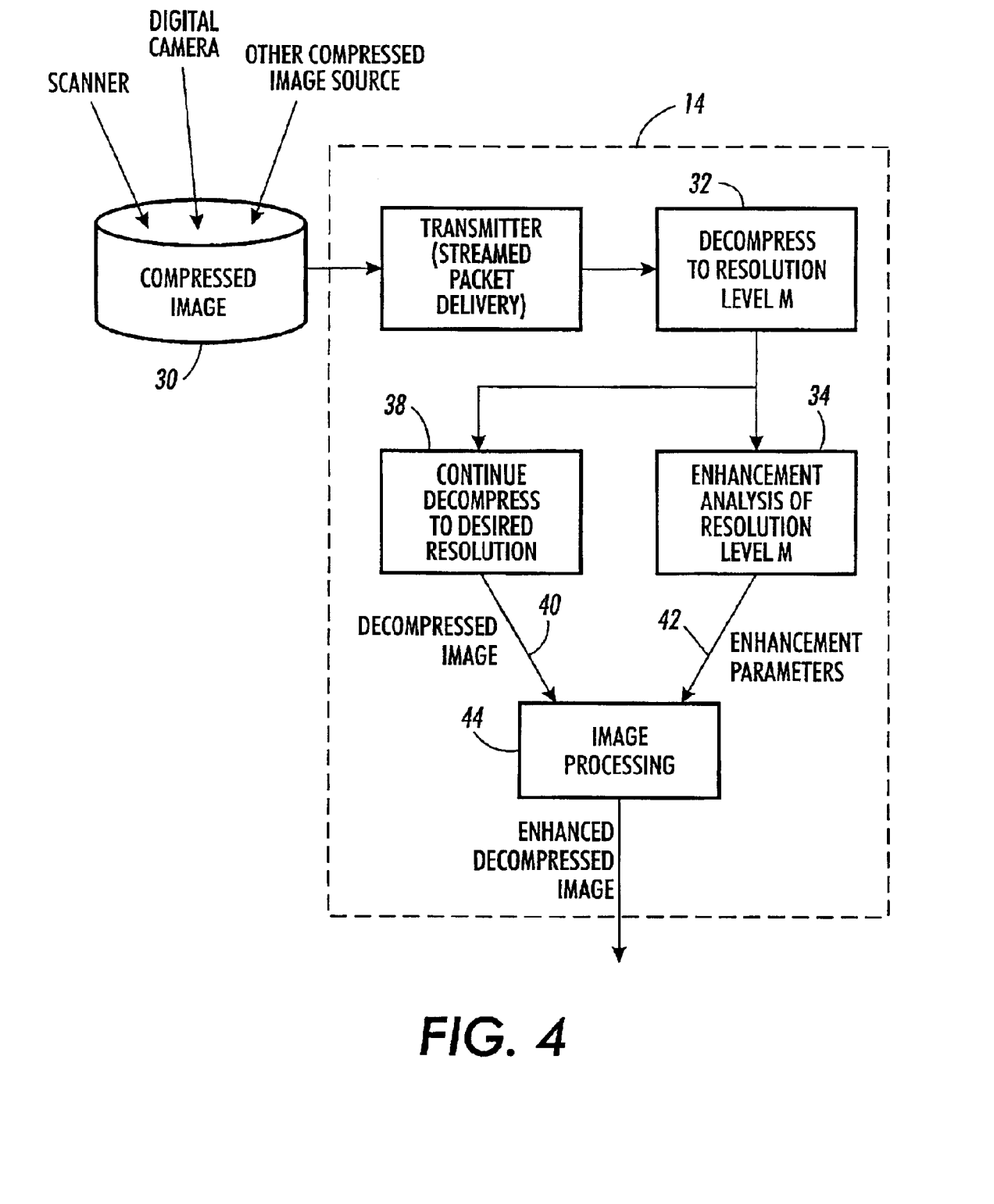
FIG. 4 is a diagrammatic illustration of a system which suitably practices one aspect of the present invention.

With reference now to FIG. 4, wavelet compressed image data 30 is transmitted to IPU 14. When wavelet compressed image data is streamed, typically the most compressed subbands arrive first and increased resolution is obtained by subsequent bands. Conventionally, the number of decompositions is generically identified with the letter N, and specific decomposition levels are generically referred to with the letter M, where the $1 \leq M \leq N$. The IPU 14 receives the stream and decompresses image data to a desired resolution level M, 32. The relatively low resolution level M, is however suitable for an enhancement analysis and development of parameters useful to enhance the entire decompressed image. Accordingly, the IPU 14 performs an enhancement analysis of the image data in the low pass subband LL at the resolution level M, 34. In one embodiment, the image data continues to stream into the IPU 14 and this data is continually decompressed until all the levels have been compressed or until the decompression is stopped, 38. The decompressed image 40 and the enhancement parameters 42 are supplied to an image processing algorithm 44 which applies the enhancement parameters to the decompressed image.

Figure 5:
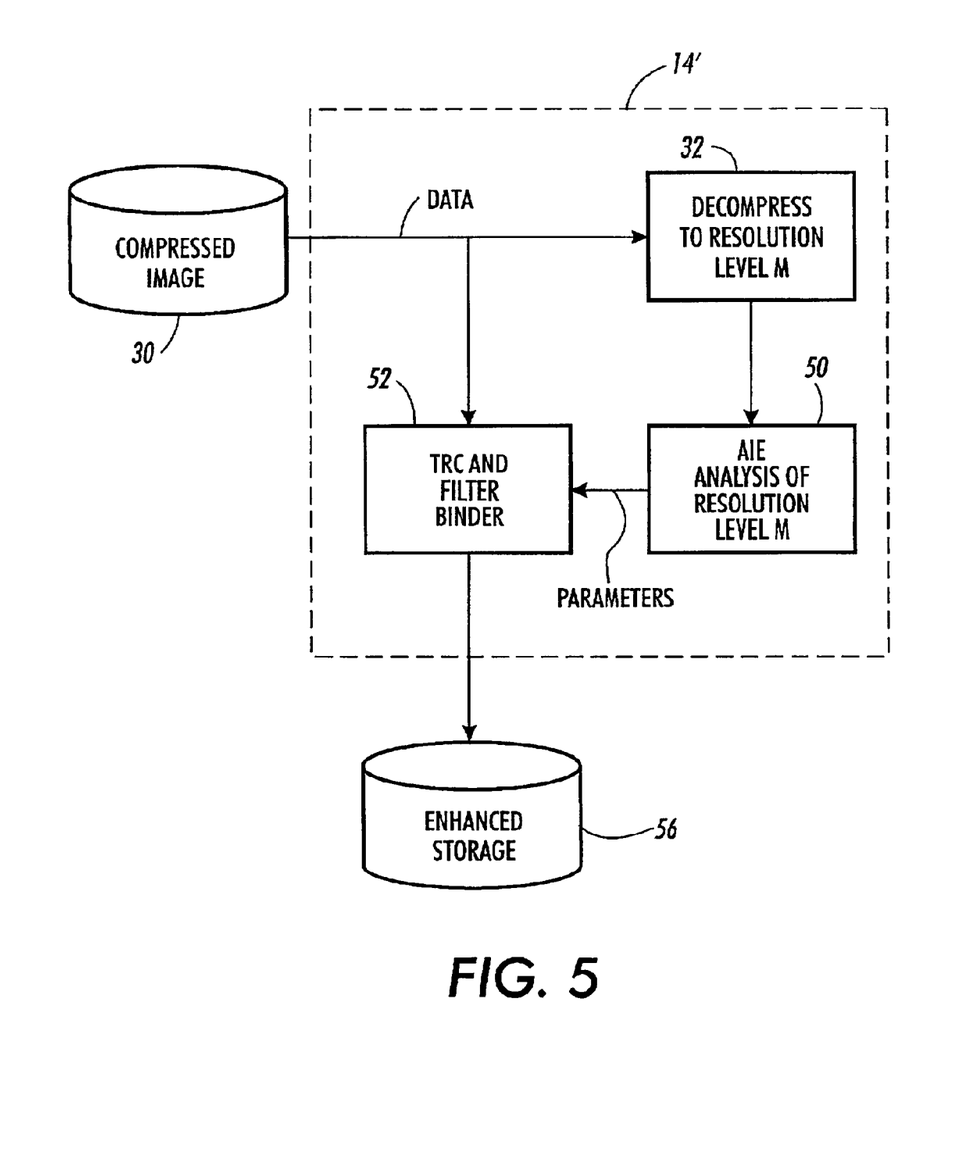
FIG. 5 is a diagrammatic illustration of a system which suitably practices another aspect of the present invention.

With reference now to FIG. 5, wavelet compressed image data 30 enters an IPU 14' and decompressed to resolution level M, 32. AIE analysis is then performed on the low pass subband LL of the resolution level M, 50. The AIE analysis corresponds to the previously mentioned patents. Results of the AIE analysis are provided to a data and parameter binder 52 which combines the compressed data stream with data representative of the enhancement determined from the AIE analysis. This bound data stream of data and enhancement parameters are then stored in an enhanced storage device 56 located in the IPU 14, on a server, in a printer and the like.

Figure 6:
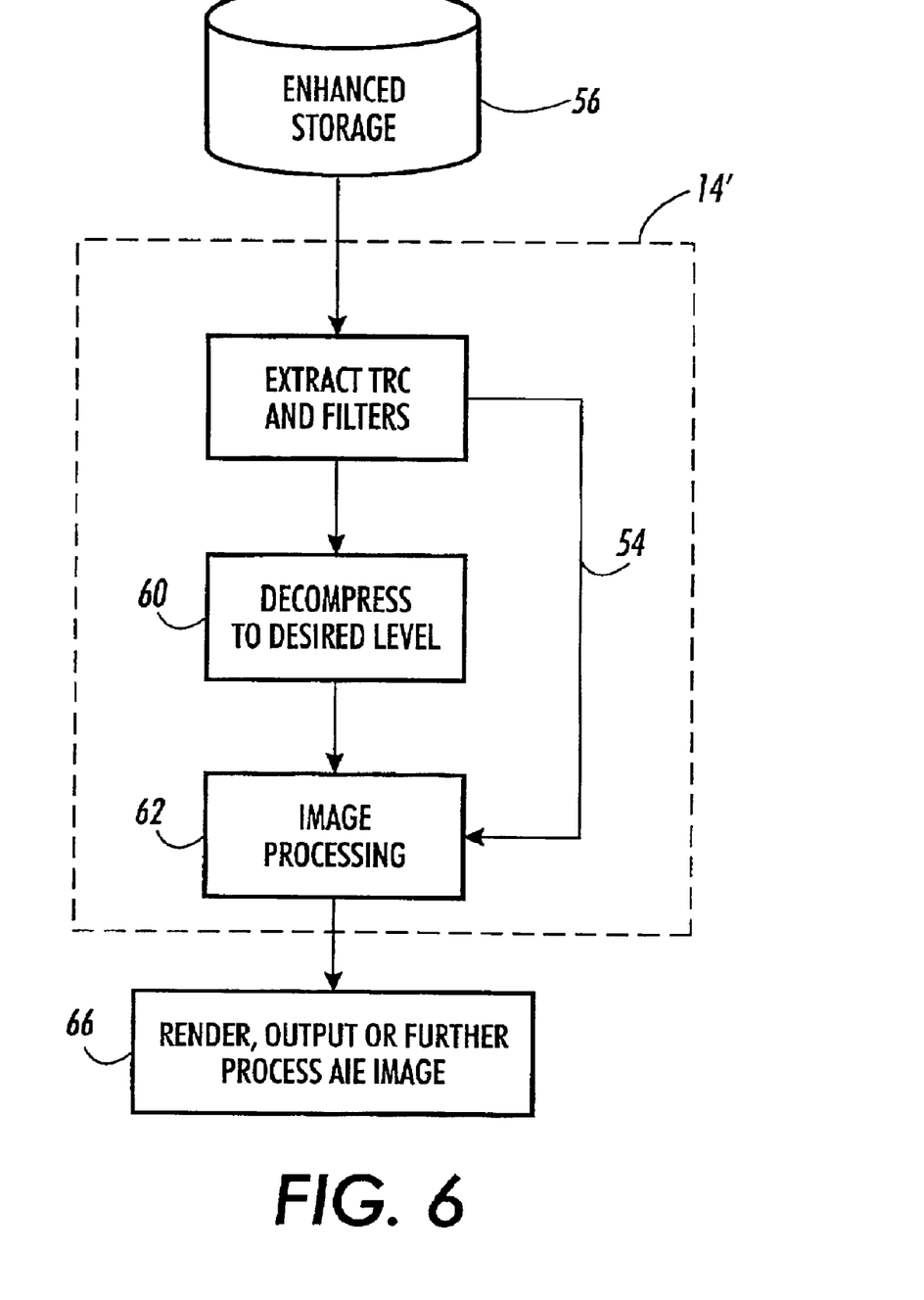
FIG. 6 is a diagrammatic illustration of a system which suitably practices the present invention according to the embodiment illustrated in FIG. 5.

Referring now to FIG. 6, in an example of using bound data and enhancement parameters, the data is extracted from the enhanced storage 56 and an extraction algorithm in the IPU 14" extracts the enhancement analysis parameters 54 from the data. The data continues decompression to a desired level 60, which when achieved is forwarded to an image processing algorithm 62 which applies the enhancement parameters 54 to the decompressed image. IPU 14" then outputs the enhanced decompressed image for rendering, storage and/or other further image processing or output, 66.

Figure 7:
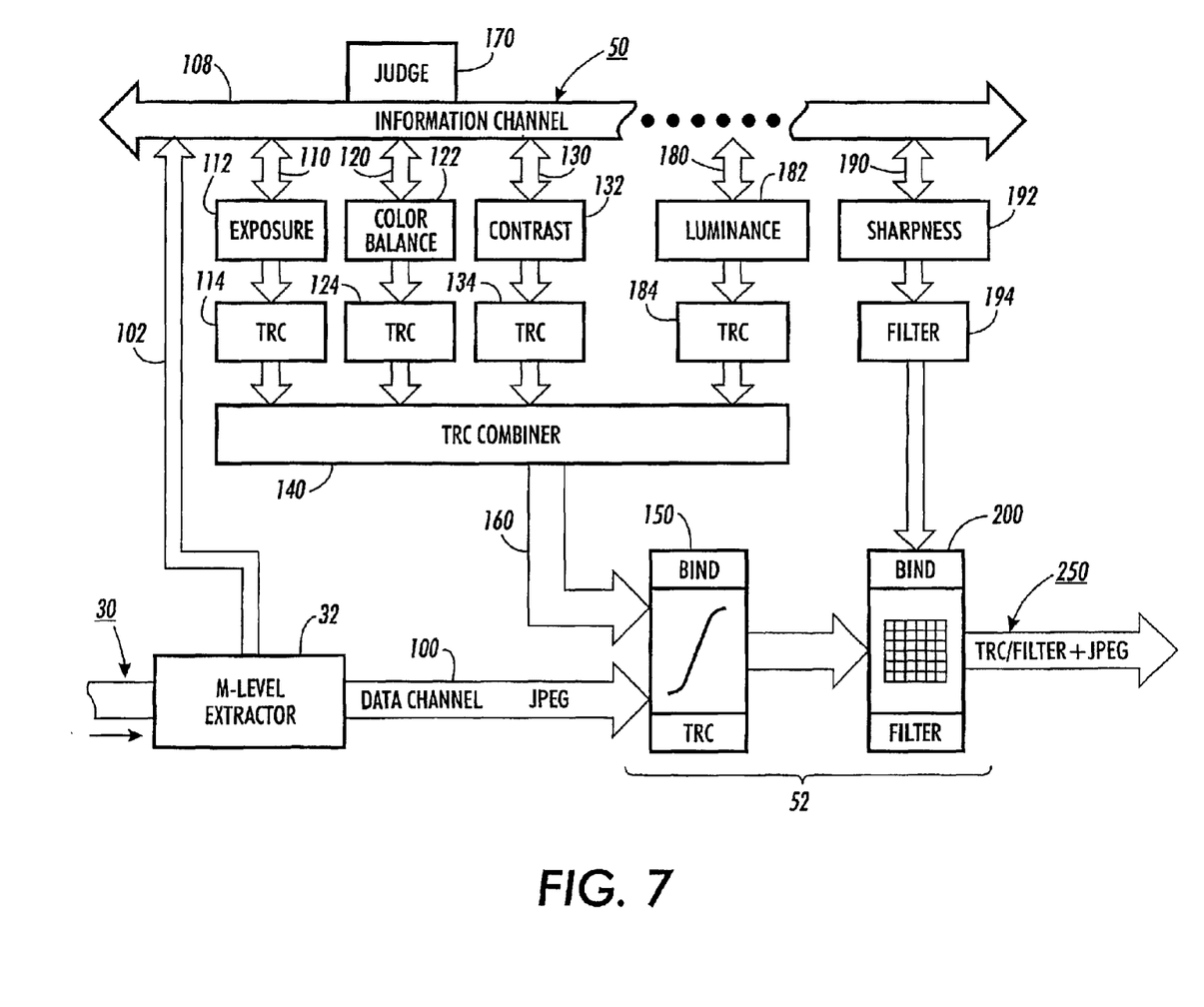
FIG. 7 is a detailed diagrammatic illustration of an enhancement mechanism which suitably practices the present invention.

Referring now to FIG. 7, a more detailed illustration of the AIE analysis and processing is illustrated. JPEG 2000, for example, wavelet compressed image data 30 is received, and an M-level extractor 32 extracts the low-pass subband LL of a determined compression level from the JPEG 2000 compressed data. The JPEG 2000 compressed data stream is unaltered by the M-level extractor 32, and is input to the binder unit 52 by way of a data channel 100.

The low-pass subband LL from the Mth-level is input via data channel 102 to the automated image enhancement (AIE) unit 50. In particular, the low-pass subband LL from the Mth-level is placed into an information channel 108 that is, in turn, operatively connected to a plurality of AIE modules, e.g., an AIE exposure module 112, an AIE color balance module 122, and AIE contrast module 132, and AIE luminance module 182, and an AIE sharpness module 192, by way of buses 110, 120, 130, 180, 190, respectively. Those of ordinary skill in the art will recognize that other AIE modules can form a part of the AIE unit 50, and it is not intended that the invention be limited to the particular AIE modules shown. The AIE modules can also return information to the information channel 108 for use by other AIE modules. The AIE modules 112, 122, 132, 182, 192, in the AIE unit 50 are described in the aforementioned Eschbach et al. and Fuss et al. U.S. Patents in greater detail.

Each of the exposure, color balance, contrast, and luminance AIE modules 112, 122, 132, 182 use the data supplied on the information channel 108 to calculate the input signals for the respective TRC generators 114, 124, 134, 184 that generate intermediate TRC's required to effect the required image modifications as determined by each module 112, 122, 132, 182. Each of the TRC generators 114, 124, 134, 184, directs a generated intermediate TRC to a TRC combiner 140 that combines the respective intermediate TRC's into a single, final TRC 160 defined by a look-up table (LUT). The final TRC is then directed to the bind TRC unit 150 of the TRC/filter binder 52 wherein it is bound to the JPEG 2000 compressed image data for subsequent use. Similarly, a sharpness module 192 receives the low-pass subband LL from the Mth-level from the information channel 108 and uses same to generate a sharpness filter 194 that is also directed to the TRC/filter binder 52, in particular to a bind filter unit 200 thereof, wherein the filter is bound to the compressed data (along with any TRC that has already been bound to the compressed data by the bind TRC unit 150. The combined TRC/Filter and JPEG 2000 compressed image data is output at 250 to downstream image processing modules 66 (as best seen in FIG. 6). It should be recognized by those of ordinary skill in the art that the final TRC 160 and/or sharpness filter 194 can be bound or otherwise operatively associated with the JPEG 2000 compressed image data for any desired length of time, including a fraction of a second or months, years, or longer such as for long-term archival storage. Furthermore, the final TRC 160 and/or filter 194 can be used immediately once derived, assuming the compressed image data has been suitably decompressed.

Those of ordinary skill in the art will recognize that the low-pass subband LL from the Mth-level extracted from the bound data provide a subsampling or lower resolution variant of the uncompressed input image data, without requiring that the image data be entirely decompressed. Thus, the low-pass subband LL from the Mth-level can be used by the AIE systems described above without significant modifications to these systems. Moreover, selectively changing which level low pass bus-band is used can correspondingly change the accuracy of the enhancement parameters calculated.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, what is claimed is:

1. An image processing method comprising:
   receiving packets of compressed image data;
   decompressing a first subset of the compressed image data, the first subset being less than a complete set; and
   from the subset, determining an adjustment to be applied to the image data.

2. The image processing method as set forth in claim 1, further comprising:
   continued decompressing additional subsets of the compressed image data resulting in a decompressed image at a desired resolution; and
   applying the adjustment to the decompressed image.

3. The image processing method as set forth in claim 1, further comprising:
   incorporating the adjustment into the compressed image data; and
   storing compressed image data incorporating the adjustment.

4. The image processing method as set forth in claim 3, wherein the step of incorporating the adjustment into the compressed image data includes bind thereto at least one of a tone reproduction curve and a sharpness filter which have been generated therefor.

5. An image processing method comprising:
   receiving wavelet-domain data defining a digital image, the wavelet-domain data comprising N levels of decomposition;
   inputting M levels of decomposition into an automated image enhancement system, where M is less than N;
   from the M levels of decomposition, deriving at least one of a correction tone reproduction curve and a sharpness filter for enhancement of the input digital image data;
   decompressing the image data to obtain decompressed image data representing the input digital image at a selected level of decomposition; and,
   using the at least one of said final tone reproduction curve and said sharpness filter to enhance the decompressed image data.

6. The image processing method as set forth in claim 5, further comprising:
   storing the at least one of said final tone reproduction curve and said sharpness filter for subsequent use in enhancing the digital image.

7. The image processing method as set forth in claim 5, wherein the step of inputting M levels of decomposition into an automated image enhancement system comprises inputting the M levels of decomposition to at least one of an exposure enhancement module, a color balance enhancement module, a contrast enhancement module, and a luminance enhancement module, said at least one module receiving the M levels of decomposition and deriving a respective tone reproduction curve.

8. The image processing method as set forth in claim 6, wherein the step of storing the at least one of the final correction tone reproduction curve and the sharpness filter for subsequent use comprises binding the at least one of the final correction tone reproduction curve and sharpness filter to the received image data.

9. The image processing method as set forth in claim 7, wherein the step of inputting the M levels of decomposition to an automated image enhancement system further comprises inputting the M levels of decomposition to a sharpness enhancement module that derives a sharpness filter based upon the M levels of decomposition.

10. A wavelet-domain image processing method comprising:
    receiving image data defining an N-level wavelet decomposition of a digital image, each of level n=1 to N of said decomposition including a horizontal subband H, a vertical subband V and a diagonal subband D; and
    performing image enhancement analysis on an Mth level wavelet decomposition, where M is less than N.

11. A xerographic apparatus which processes wavelet-domain image data comprising:
    means for receiving the wavelet-domain image data representative of an input digital image, said wavelet-domain image data including N-levels of wavelet decompositions;
    an M-level extractor which extracts an Mth level wavelet decomposition from the wavelet-domain image data where M is less than N, the extracted Mth level wavelet decomposition being a low resolution representation of the input digital image; and
    an image enhancement system which receives the extracted Mth level wavelet decomposition, the system deriving an enhancement process from the extracted Mth level wavelet decomposition to adjust a high resolution representation of the input digital image.

12. The apparatus for processing wavelet-domain image data as set forth in claim 11, where the enhancement process derived by the image enhancement system comprises a tone reproduction curve.

13. The apparatus for processing wavelet-domain image data as set forth in claim 11, where the enhancement process derived by the image enhancement system comprises a sharpness filter.

14. The apparatus for processing wavelet-domain image data as set forth in claim 11, further comprising:
    means for converting the wavelet-domain image data into the high resolution representation of the input digital image; and,
    a processor which applies the enhancement process to the high resolution representation of the input digital image provided by the converting means.

15. The apparatus for processing wavelet-domain image data as set forth in claim 11, further comprising:
    a storage which at least temporarily stores the enhancement process for subsequent use in enhancing the input digital image.

16. The apparatus for processing wavelet-domain image data as set forth in claim 15, where the storage comprises data representative of the enhancement process inserted in the wavelet-domain image data.

17. The apparatus for processing wavelet-domain image data as set forth in claim 11, where the image enhancement system comprises:

at least one of an exposure enhancement module, a color balance enhancement module, a contrast enhancement module, and a luminance enhancement module, said at least one module receiving and deriving a respective tone reproduction curve based upon at least the extracted Mth level wavelet decomposition; and, a combiner which combines derived tone reproduction curves into a final correction tone reproduction curve.

18. The apparatus for processing wavelet-domain image data as set forth in claim 11, where image enhancement system further comprises a sharpness enhancement module that derives a sharpness filter based upon the extracted Mth level wavelet decomposition.

* * * * *